Patented Sept. 10, 1929.

1,728,059

UNITED STATES PATENT OFFICE.

THEODORE C. HEISIG, OF HOUSTON, TEXAS, ASSIGNOR TO GALENA-SIGNAL OIL COMPANY OF TEXAS, OF HOUSTON, TEXAS, A CORPORATION OF TEXAS.

METHOD OF REFINING OIL.

No Drawing.   Application filed May 19, 1926.  Serial No. 110,288.

This invention relates to the art of refining lubricating oils, and has particular reference to the treatment of oils of high viscosity.

An object of the invention is to provide a process which will produce an oil light in color and of superior quality and purity.

A further object is to provide a process, which effects an economy in the quantity of acid consumed, lessens treating losses and accelerates the treatment, particularly of heavy viscosity oils.

The improvement is particularly applicable to that process known as the "contact process," which consists in intimately mixing with the oil fine clay, fuller's earth, charcoal, or similar absorbing and coagulating material; heating the resulting mixture, and in removing the fine clay, or other absorbing material after the desired reaction has been completed.

In the treatment of heavy viscosity oils, as for example, cylinder stocks, the oil is diluted with naphtha or other suitable non-viscous hydrocarbon solvent. The diluted oil is then treated with sulphuric acid in quantities depending on the quality of the finished product desired. The sludge is removed by any convenient method and the diluted acid oil neutralized with alkali and pumped to a still, or the diluted acid oil may be pumped to a still without neutralizing. The solvent is then distilled off, leaving as a residue an oil of much lighter color and greater purity than the original stock. The oil so produced may then be filtered, or not, as desired. However, in treating some oils, as for example those from asphalt or naphthene base crude oils, in the manner above outlined, it will be found that the residue in the still is generally of poorer color and quality than the original oil and is not of a merchantable character.

In the treatment of oils of the above noted asphalt or naphthene base varieties, after the sludge has been removed from the diluted oil, but without any neutralization with alkalies, if a quantity of fine clay, fuller's earth, or other absorbent or coagulant is added and intimately mixed with the diluted oil, and the resulting mixture pumped to a still, it will be found that on distilling off the naphtha with the aid of heat and steam injected into the body of the oil, that the clay, etc., kept in intimate contact with the oil due to the non-viscous nature of the latter on account of its dilution, and due to the agitation with steam, and finally due to the contact reaction between the clay, etc., and the reduced oil under the action of heat, the clay, etc., will have neutralized and absorbed the acid compounds and coloring matter in the oil. The resulting residue, after separation of the clay, etc., by any convenient method, as by filtration, will be of lighter color and of greater purity than could be obtained by any other known method. The oil thus treated will be a filtered product and will require no further purification.

A specific example is as follows:—

Eight hundred barrels of a heavy lubricating stock is mixed with two hundred barrels of naphtha in a storage tank. The diluted oil is then agitated with 1 percent of 93% sulphuric acid to remove any water. Subsequently the watery acid is drawn off, leaving the oil relatively dry. It is then agitated with 4% of 98% acid. The reaction product, or sludge, is either allowed to settle or is broken down with water and the sludge drawn off. The diluted oil, now free of sludge, but containing a small quantity of acid and acid compounds, is transferred to another tank or agitator where it is mixed in any suitable manner with fine clay, fuller's earth, charcoal or other absorbent. The amount of fine clay, etc., will vary from 1 to 5 percent by weight of oil, depending on the quality desired on the finished product.

The diluted oil with the suspended fine clay is transferred to a still where the naphtha is removed by means of fire and steam in the customary manner, live steam being introduced into the oil through perforated sprays or manifold.

The entire quantity of diluent will usually be distilled off at a temperature of 450° to 500° F., and can be reused. At this point the fire is drawn and only enough steam left to insure agitation. The hot oil containing the fine clay is pumped through a filter press where the latter is removed, the clear finished oil discharged from the press being then cooled and run to storage.

As pointed out above, the use of the dilution principle permits a saving in several ways over the known processes. Among the advantages are:—first—less acid is used to dehydrate the oil preparatory to the main acid treatment, owing to a more complete settling out of the acidified water; second—more intimate contact of the main treating acid with the oil; third—more rapid and complete settling out of the acid sludge after treatment, reducing the loss as well as the amount of acid retained by the oil layer; fourth—as a result of the third advantage just noted, less clay, etc., is required to neutralize the acid compounds and bleach the oil; fifth—more intimate contact and reaction between the clay, etc., and the oil due to the low viscosity, and violent agitation as a result of the distilling operation.

The improved process results in considerable economy in refining operations, and produces a superior grade of oil with larger yields than has heretofore been obtained from the crude oils of the asphalt and naphthene bases.

Having described my invention, I claim:

1. A continuous method of refining heavy viscosity oils of the nature of asphalt or naphthene base crude, which consists in diluting the stock with naphtha, adding about one per cent of 93% sulphuric acid to absorb water, removing the acid water and agitating the relatively dry stock in the presence of about four per cent of 98% sulphuric acid, drawing off the reaction product or sludge, mixing the diluted stock with its contained acid and acid compounds with an adsorbent, distilling off the diluent while subjecting the mixture to violent agitation in the presence of heat and steam, and filtering the hot oil.

2. A method as set forth in claim 1, wherein the diluent is distilled off at a temperature of four hundred fifty to five hundred degrees F., and recovered.

3. A method as set forth in claim 1, wherein after distilling off the diluent, the fire is drawn and just enough steam maintained to effect agitation.

In testimony whereof I affix my signature.

THEODORE C. HEISIG.